US012756324B2

(12) United States Patent
Angkititrakul et al.

(10) Patent No.: US 12,756,324 B2
(45) Date of Patent: Oct. 6, 2026

(54) SWITCH MODE POWER CONVERTER WITH ADAPTIVE GATE VOLTAGE REGULATION FOR FAST TURN-OFF OF SYNCHRONOUS RECTIFIER

(71) Applicant: Alpha and Omega Semiconductor International LP, Toronto (CA)

(72) Inventors: Sitthipong Angkititrakul, Dublin, CA (US); Yu Ding, Shanghai (CN); Jian Yin, San Ramon, CA (US)

(73) Assignee: Alpha and Omega Semiconductor International LP, Toronto (CA)

( * ) Notice: Subject to any disclaimer, the term of this patent is extended or adjusted under 35 U.S.C. 154(b) by 128 days.

(21) Appl. No.: 18/959,681

(22) Filed: Nov. 26, 2024

(65) Prior Publication Data

US 2025/0088118 A1 Mar. 13, 2025

Related U.S. Application Data

(63) Continuation of application No. 18/058,219, filed on Nov. 22, 2022, now Pat. No. 12,218,602.

(51) Int. Cl.
*H02M 1/08* (2006.01)
*H02M 1/36* (2007.01)
*H02M 3/335* (2006.01)

(52) U.S. Cl.
CPC ......... *H02M 3/33592* (2013.01); *H02M 1/36* (2013.01)

(58) Field of Classification Search
CPC ....... H02M 1/08; H02M 3/33592; H02M 1/36
See application file for complete search history.

(56) References Cited

U.S. PATENT DOCUMENTS

| | | | |
|---|---|---|---|
| 5,206,800 | A | 4/1993 | Smith |
| 5,402,329 | A | 3/1995 | Wittenbreder, Jr. |
| 5,757,626 | A | 5/1998 | Jovanovic et al. |
| 5,991,171 | A | 11/1999 | Cheng |
| 5,991,172 | A | 11/1999 | Jovanovic et al. |
| 6,188,592 | B1 | 2/2001 | Farrington et al. |
| 6,198,638 | B1 | 3/2001 | Lee |

(Continued)

FOREIGN PATENT DOCUMENTS

| | | | |
|---|---|---|---|
| CN | 110429801 | A | 11/2019 |

OTHER PUBLICATIONS

M. T. Zhang, M. M. Jovanovic and F. C. Lee, "Design considerations and performance evaluations of synchronous rectification in flyback converters," Applied Power Electronics Conference and Exposition, 1997, APEC '97 Conference Proceedings 1997., Twelfth Annual, Atlanta, GA, 1997, pp. 623-630 vol. 2.

(Continued)

*Primary Examiner* — Adolf D Berhane

(57) ABSTRACT

A power converter incorporating a synchronous rectifier implements adaptive gate voltage regulation for fast turn-off of the synchronous rectifier. In some embodiments, the adaptive gate voltage regulation circuit detects a voltage indicative of a drain current of the synchronous rectifier in each SR conduction cycle and monitors a slope of the detected voltage indicative of a rate of decrease of the drain current of the synchronous rectifier. The adaptive gate voltage regulation circuit further selects a gate discharge current as a function of the slope of the detected voltage to apply to the gate terminal of the synchronous rectifier.

17 Claims, 9 Drawing Sheets

(56) References Cited

U.S. PATENT DOCUMENTS

| | | | | |
|---|---|---|---|---|
| 7,876,584 | B2 | 1/2011 | Havanur | |
| 8,067,973 | B2 | 11/2011 | Bakker | |
| 11,387,738 | B2 * | 7/2022 | Cheng | H02M 3/33523 |
| 12,218,602 | B2 * | 2/2025 | Angkititrakul | H02M 3/33592 |
| 12,388,373 | B2 * | 8/2025 | Ding | H02M 3/33592 |
| 12,431,816 | B1 * | 9/2025 | Mednik | H02M 1/322 |
| 2006/0013022 | A1 | 1/2006 | Jitaru | |
| 2015/0280573 | A1 | 10/2015 | Gong et al. | |
| 2016/0111961 | A1 | 4/2016 | Balakrishnan et al. | |
| 2016/0294292 | A1 | 10/2016 | Huang et al. | |
| 2016/0329819 | A1 | 11/2016 | Chen et al. | |
| 2020/0153327 | A1 | 5/2020 | Lin et al. | |

OTHER PUBLICATIONS

A. M. Connaughton, K. Krischan, K. K. Leong and A. Muetze, "New control concept for soft-switching Flyback converters with very high switching frequency," 2016 IEEE Applied Power Electronics Conference and Exposition (APEC), Long Beach, CA, USA, 2016, pp. 355-361.

* cited by examiner

SWITCH MODE POWER CONVERTER WITH ADAPTIVE GATE VOLTAGE REGULATION FOR FAST TURN-OFF OF SYNCHRONOUS RECTIFIER

CROSS REFERENCE TO RELATED APPLICATIONS

This application is a continuation of U.S. patent application Ser. No. 18/058,219, entitled SWITCH MODE POWER CONVERTER WITH SYNCHRONOUS RECTIFIER IMPLEMENTING ADAPTIVE GATE VOLTAGE REGULATION FOR FAST TURN-OFF, filed Nov. 22, 2022, which is incorporated herein by reference in its entirety.

FIELD OF THE INVENTION

The invention relates to switching regulator circuits and methods and, in particular, to a switching regulator with synchronous rectifier implementing adaptive gate voltage regulation for fast synchronous rectifier turn-off.

BACKGROUND OF THE INVENTION

Power converters are used in a wide range of electronic applications to convert an AC voltage to a DC voltage or to convert DC voltages from one voltage value to another. Commonly used power converters include the switch mode power supplies or switch mode converters, also referred to as switching regulators or DC-DC converters. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

The flyback converter is one type of switch mode power converter with applications in electronic devices, such as televisions or computers, or mobile device chargers. Flyback converters also have applications in high-voltage supplies in electronic equipment, such as televisions or monitors.

The flyback converter is an isolated power converter that is commonly used in both AC-to-DC and DC-to-DC conversion with galvanic isolation between the input and the one or more outputs. More specifically, the flyback converter is a buck-boost converter with the inductor split to form a transformer, so that the voltage ratios are multiplied with an additional advantage of isolation. Synchronous rectification is often applied to replace the diode rectifier to improve efficiency. FIG. 1 is an example of a flyback converter using synchronous rectification. As shown in FIG. 1, a typical construction of the flyback converter includes a primary switch (SW) coupled to the primary transformer winding of a transformer Lm and a synchronous rectifier switch (SR) coupled to the secondary transformer winding of the transformer Lm. The input voltage $V_{IN}$ is provided across the primary winding and the primary switch. The primary switch is controlled by a control voltage $V_{GS}$ to turn on and off to conduct a primary current Ipri. The primary switch and the synchronous rectifier are complementary in operation with one switch being turned on while the other switch is turned off. The conduction periods of the primary switch SW and the synchronous rectifier SR do not overlap. The current flowing on the secondary side, referred to as the secondary current Isec, charges an output capacitor C3 to provide the output voltage Vo. In some cases, active clamping may be implemented at the primary side to clamp the voltage at the drain terminal of the primary switch SW when the primary switch SW is turned off FIG. 2 illustrates exemplary signals waveforms for operating the flyback converter of FIG. 1 in a constant frequency, continuous-conduction-mode (CF CCM). FIG. 3 illustrates exemplary signals waveforms for operating the flyback converter of FIG. 1 in a constant frequency, discontinuous-conduction-mode (CF DCM). The flyback converter of FIG. 1 and the operation modes of FIGS. 2 and 3 are described in detail in the paper by M. T. Zhang, M. M. Jovanovic and F. C. Lee, "Design considerations and performance evaluations of synchronous rectification in flyback converters," Applied Power Electronics Conference and Exposition, 1997, APEC '97 Conference Proceedings 1997, pp. 623-630 vol.2. In short, when operated in the CCM operation mode, the secondary current Isec does not go to zero current value before the start of the next switching cycle (primary switch SW turns on), as shown in FIG. 2. On the other hand, when operated in the DCM operation mode, the secondary current Isec decreases to zero current value before the start of the next switching cycle, as shown in FIG. 3.

In particular, when the power converter with synchronous rectifier is operated in the discontinuous-conduction-mode, the secondary current goes to zero before the primary side is turned on. In practice, when the synchronous rectifier is signaled to be turned off, propagation delay and gate driver discharge time result in a certain amount of delay in the gate drive voltage $V_{GS}$ actually decreasing to a voltage level to turn off the synchronous rectifier. Secondary reverse current can result when the synchronous rectifier is turned off after the secondary current crosses zero current. In practice, if the synchronous rectifier is not turned off fast enough, a large reverse current can result which can lead to undesirably high drain-to-source voltage spike across the synchronous rectifier, which can impact the reliability of the synchronous rectifier device and the power converter in general.

SUMMARY OF THE INVENTION

The present disclosure discloses a power converter with adaptive gate voltage regulation for the synchronous rectifier, substantially as shown in and/or described below, for example in connection with at least one of the figures, as set forth more completely in the claims.

In some embodiments, a power converter includes an input terminal receiving an input voltage and an output terminal providing an output voltage; a synchronous rectifier coupled to the output terminal; and a controller coupled to generate a gate control signal to drive a gate terminal of the synchronous rectifier over a plurality of synchronous rectifier (SR) conduction cycles, the controller comprising an adaptive gate voltage regulation circuit detecting a voltage indicative of a drain current of the synchronous rectifier in each SR conduction cycle and monitoring a slope of the detected voltage indicative of a rate of decrease of the drain current of the synchronous rectifier, the adaptive gate voltage regulation circuit further selecting a gate discharge current as a function of the slope of the detected voltage to apply to the gate terminal of the synchronous rectifier.

These and other advantages, aspects and novel features of the present invention, as well as details of an illustrated embodiment thereof, will be more fully understood from the following description and drawings.

BRIEF DESCRIPTION OF THE DRAWINGS

Various embodiments of the invention are disclosed in the following detailed description and the accompanying drawings. Although the drawings depict various examples of the invention, the invention is not limited by the depicted examples. It is to be understood that, in the drawings, like reference numerals designate like structural elements. Also, it is understood that the depictions in the figures are not necessarily to scale.

DETAILED DESCRIPTION OF THE INVENTION

A power converter incorporating a synchronous rectifier implements adaptive gate voltage regulation for fast turn-off of the synchronous rectifier. In some embodiments, the adaptive gate voltage regulation circuit and method monitors the slope of the synchronous rectifier current during the on period of the synchronous rectifier. In response to detecting the synchronous rectifier current decreasing rapidly, i.e. having a large downward slope, the adaptive gate voltage regulation circuit and method applies a larger gate discharge current to quickly discharge the synchronous rectifier gate voltage. In response to detecting the synchronous rectifier current decreasing more moderately, i.e. having a small downward slope, the adaptive gate voltage regulation circuit and method applies a smaller gate discharge current to discharge the synchronous rectifier gate voltage in a moderate manner. As thus configured, the synchronous rectifier can be turned off quickly even in the case when the drain current is decreasing rapidly. When the synchronous rectifier can be turned off quickly, large reverse current or negative current as well as large drain voltage spike at the synchronous rectifier can be avoided. The reliability of the synchronous rectifier and the power converter is improved. The adaptive gate voltage regulation circuit and method is particularly useful when the power converter is operated in the discontinuous conduction mode.

In the present embodiment, the power converter is a flyback converter including a synchronous rectifier coupled to the secondary winding of the transfer. In other embodiments, the power converter can be any other types of switch mode power supplies incorporating the use of a synchronous rectifier. For example, the power converter can be a boost or buck-boost converter, without the use of a transformer, or any DC-DC converters, or an LLC SSR converter, or any power converter that uses detection of the synchronous rectifier voltage. In the following description, the flyback converter is used as an example of illustrating the implementation of the adaptive gate voltage regulation circuit and method. The use of a flyback converter as the power converter is illustrative only and not intended to be limiting.

Figure 1:
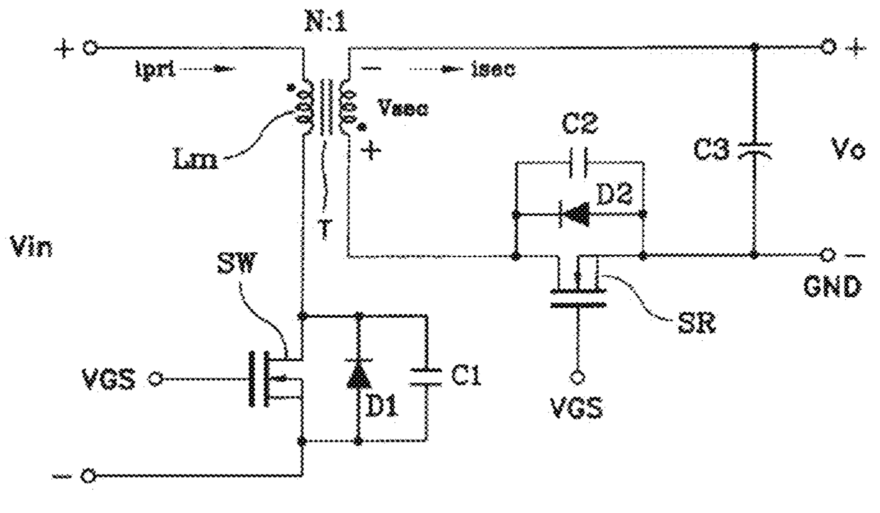
Fig. 1 (Prior Art)
FIG. 1 is an example of a flyback converter using synchronous rectification.
Figure 2:
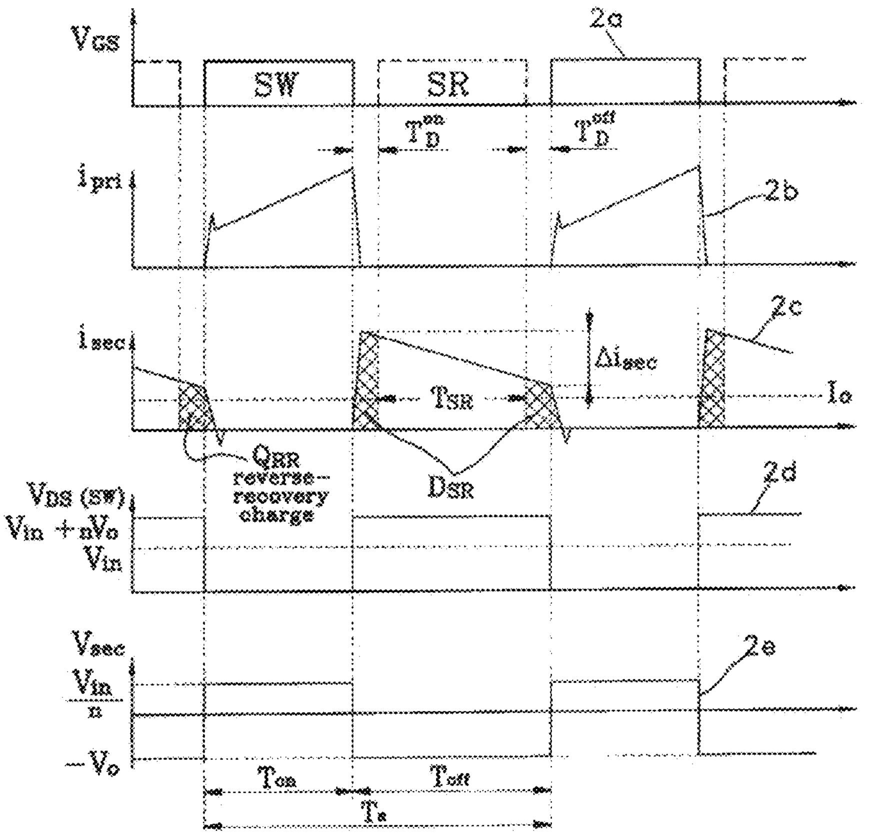
Fig. 2 (Prior Art)
FIG. 2 illustrates exemplary signals waveforms for operating the flyback converter of FIG. 1 in a constant frequency, continuous-conduction-mode (CF CCM).
Figure 3:
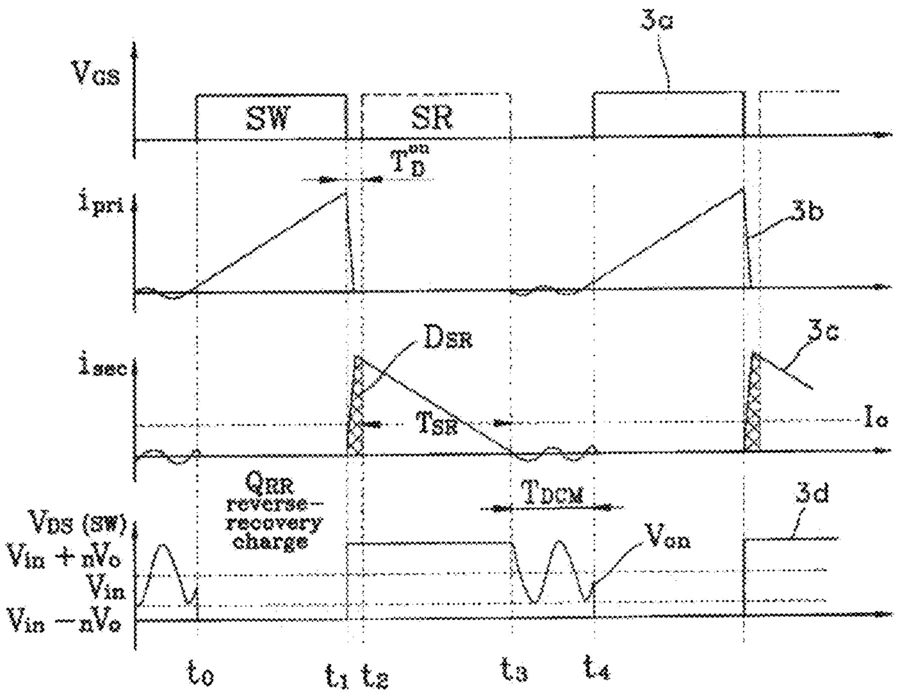
Fig. 3 (Prior Art)
FIG. 3 illustrates exemplary signals waveforms for operating the flyback converter of FIG. 1 in a constant frequency, discontinuous-conduction-mode (CF CCM).
Figure 4:
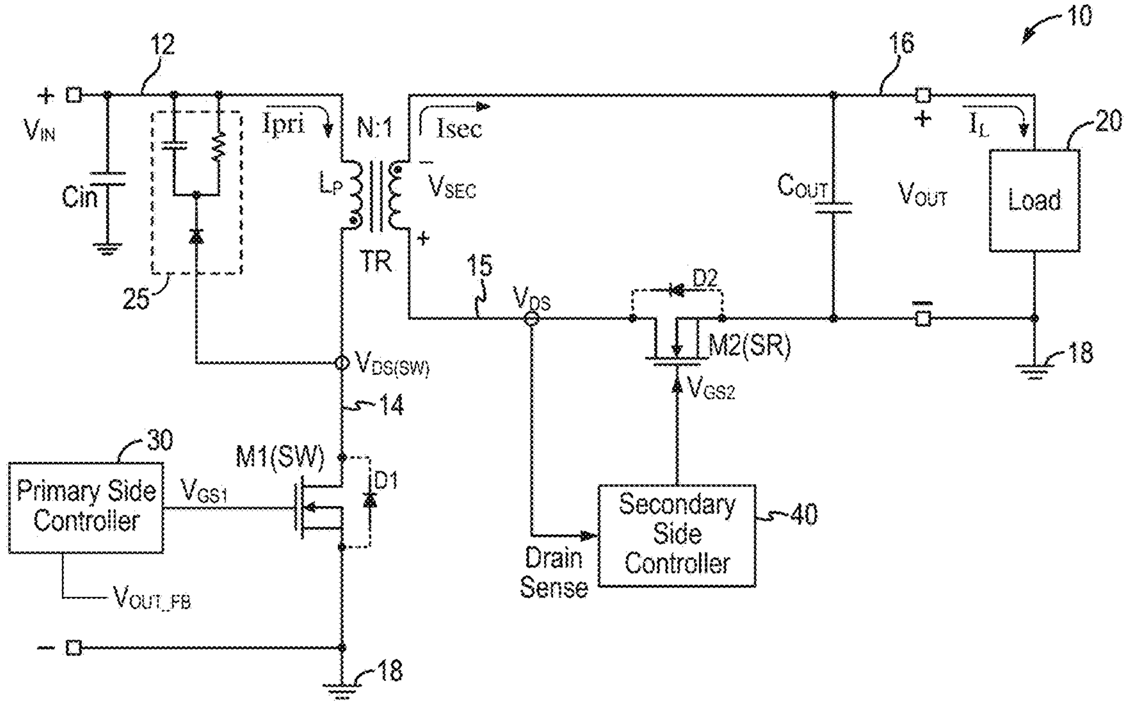
FIG. 4 is a schematic diagram of a flyback converter in embodiments of the present invention.

FIG. 4 is a schematic diagram of a flyback converter in embodiments of the present invention. Referring to FIG. 4, a flyback converter 10 includes a primary switch M1 (SW) coupled to the primary transformer winding of a transformer $L_P$and a synchronous rectifier switch M 2 (SR) coupled to the secondary transformer winding of the transformer $L_P$. The input voltage $V_{IN}$ is coupled across the primary winding and the primary switch, between the input voltage node 12 and the ground node 18. An input decoupling capacitor Cin may be coupled to the input voltage node 12. The primary switch is controlled by a control voltage $V_{GS1}$ to turn on and off to conduct a primary current Ipri flowing in the primary transformer winding. The synchronous rectifier switch is controlled by a control voltage $V_{GS2}$ to turn on and off to conduct a secondary current Isec flowing in the secondary transformer winding. In the present description, the term "primary current" refers to the current flowing in the primary transformer winding and the terms "secondary current" and "synchronous rectifier current" are both used to refer to the current flowing in the secondary transformer winding of the transformer $L_P$, which is the current flowing in the synchronous rectifier. An output capacitor $C_{OUT}$ is coupled across the secondary winding and the synchronous rectifier, that is, between the output node 16 and the ground node 18. An output voltage $V_{OUT}$ is generated at the output node 16 to drive a load 20. In some embodiments, an active clamping circuit 25 may be provided at the primary side to clamp the voltage at the drain terminal (node 14) of the primary switch M1 when the primary switch M1 is turned off.

In embodiments of the present invention, the primary switch M1 and the synchronous rectifier M2 are power switches, typically MOSFET devices. In the present embodiment, both the primary switch M1 and the synchronous rectifier M2 are constructed using NMOS transistors. The NMOS transistor of primary switch M1 has a drain terminal coupled to the transformer $L_P$ (node 14), a source terminal coupled to ground (node 18) and a gate terminal driven by the control voltage $V_{GS1}$. As an NMOS transistor, the primary switch M1 also has associated parasitic body diode D1 across the drain and source terminal of the transistor. In the present illustration, the body diode D1 are shown as being connected in dotted lines across NMOS switch M1 to indicate that the body diode D1 is a parasitic diode only and not an added diode element. At the secondary side, the NMOS transistor of synchronous rectifier switch M2 has a drain terminal (node 15) coupled to the transformer $L_P$, a source terminal coupled to ground (node 18) and a gate terminal driven by the control voltage $V_{GS2}$. As an NMOS transistor, the synchronous rectifier switch M2 has associated parasitic body diode D2 across the drain and source terminal of the transistor M2. Again, the body diode D2 is shown as being connected in dotted line across NMOS switch M2 to indicate that the diode D2 is a parasitic element formed as part of the NMOS transistor structure. In the present description, the secondary current is also referred to as the drain-to-source current $I_{DS}$ (or "drain current $I_{DS}$") of the MOSFET switch as the synchronous rectifier.

As thus configured, the primary switch M1 and the synchronous rectifier M2 are each driven by respective controller circuits to control the on and off operations of the switches. Specifically, a primary side controller 30 is coupled to drive the gate terminal of the primary switch M1 and a secondary side controller 40 is coupled to drive the gate terminal of the synchronous rectifier M2. The primary side controller 30 and the secondary side controller 40 can be constructed in various manner based on the control scheme selected for the flyback converter 10. In other words, the flyback converter 10 is a power stage and different control schemes can be used to control the flyback converter power stage. In operation, the switching of the primary switch is synchronized to the switching of the synchronous rectifier. In most implementations, either the primary side controller is the master controller with the secondary side controller being the slave or the secondary side controller is the master controller with the primary side controller being the slave. The master controller is usually implemented as a PWM controller. Examples of control schemes that can be used in the flyback converter 10 includes quasi-resonant mode control, voltage mode control, peak current mode control and input voltage feedforward control. Each of the control schemes uses different feedback signals to control and maintain a constant output voltage and to provide load regulation. The specific implementation of the control schemes in the flyback converter 10 is not critical to the practice of the present invention. One of ordinary skill in the art would appreciate that the adaptive gate voltage regulation circuit and method can be applied in any of the control schemes to enable fast turn off of the synchronous rectifier in the discontinuous conduction mode. In the present illustration, a primary side controller and a secondary side controller are provided. In other embodiments, the primary side controller and a secondary side controller can be constructed as a single controller or control circuit generating the control signals for the primary switch and the synchronous rectifier switch.

In one example, the flyback converter power stage implements a control scheme with the secondary side being the master controller. In that case, the secondary side controller is a PWM controller configured to regulate the output voltage $V_{OUT}$. Alternately, the flyback converter power stage may be implemented with the primary side controller being the master controller. In that case, the primary side controller includes a PWM controller configured to regulate the output voltage $V_{OUT}$, such as through a feedback voltage $V_{OUT\_FB}$. The secondary side controller includes logic circuits to control the synchronous rectifier in response to the drain voltage $V_{DS}$ detected at the drain terminal of the synchronous rectifier MOSFET.

Figure 5:
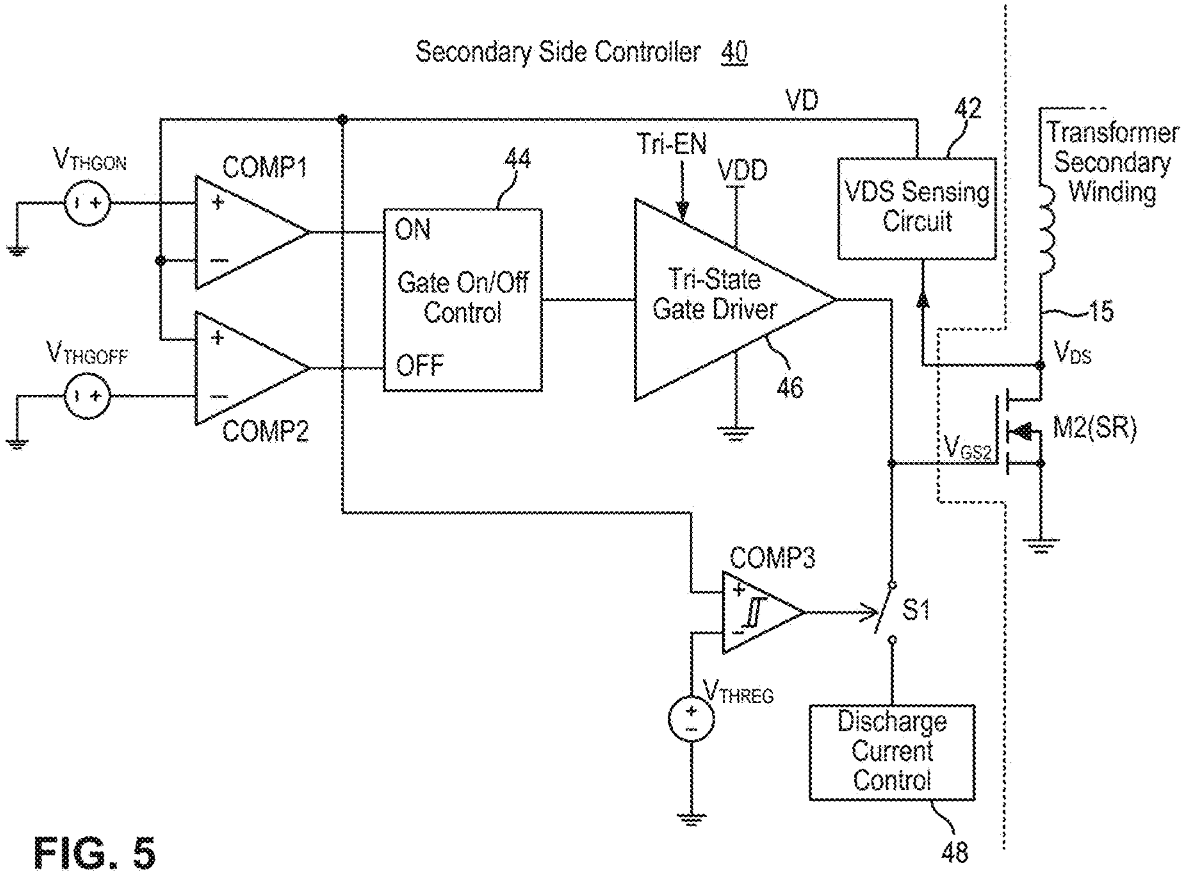
FIG. 5 is a schematic diagram of a secondary side controller in the flyback converter of FIG. 4 in embodiments of the present invention.

FIG. 5 is a schematic diagram of a secondary side controller in the flyback converter of FIG. 4 in embodiments of the present invention. Referring to FIG. 5, a secondary side controller 40 for generating the gate voltage $V_{GS2}$ to control the synchronous rectifier MOSFET M2 includes a drain voltage VDS sensing circuit 42 for sensing the drain voltage $V_{DS}$ of the synchronous rectifier M2. The sensed drain voltage, denoted as VD, is coupled to a pair of comparators COMP1 and COMP2, to be compared with respective detection threshold voltages to generate the gate on/off control signal for the synchronous rectifier M2. In particular, the comparator COMP1 compares the sensed drain voltage VD (at the negative input terminal) to a SR turn on detection voltage $V_{THGON}$ (at the positive input terminal) to determine when the synchronous rectifier M2 should be turned on and the comparator COMP2 compares the sensed drain voltage VD (at the positive input terminal) to a SR turn off detection voltage $V_{THGOFF}$ (at the negative input terminal) to determine when the synchronous rectifier M2 should be turned off. In this operation regime, the sensed drain voltage VD has a negative voltage value and the SR turn on detection voltage $V_{THGON}$ as well as the SR turn off detection voltage $V_{THGOFF}$ are both negative voltage values. The secondary side controller 40 includes a gate on/off control logic circuit 44 which receives the output signals from the comparators COMP1 and COMP2 and generate the on/off control signal. The on/off control signal is coupled to a tri-state gate driver 46, which when enabled by the enable signal Tri-EN, provides the gate voltage $V_{GS2}$ to drive the gate terminal of the synchronous rectifier M2. In the present example, the secondary side controller 40 further includes a comparator COMP3 for comparing the sensed drain voltage VD (at the positive input terminal) to a regulation threshold voltage $V_{THREG}$ (at the negative input terminal). When the sensed drain voltage VD reaches the regulation threshold voltage $V_{THREG}$, the comparator COMP3 closes switch S1 to allow a discharge current control circuit 48 to regulate the gate voltage $V_{GS2}$ to lower voltage values in response to the decreasing secondary current, as will be explained in more detail below.

The flyback converter 10 may be operated in the discontinuous conduction mode or continuous conduction mode. When operated in the continuous conduction operation mode, the primary switch turns on for the next switching cycle prior to the secondary current Isec reaches zero current value. On the other hand, when operated in the discontinuous conduction operation mode, the secondary current Isec decreases to zero current value before the primary switch turns on for the start of the next switching cycle. In embodiments of the present invention, the secondary side controller 40 includes an adaptive gate voltage regulation circuit (not shown) to adjust the discharge current provided to discharge the gate voltage of the synchronous rectifier, as will be explained in more detail below.

The general operation of the flyback converter 10 will now be described. Referring to FIGS. 4 and 5, the flyback converter 10 can be controlled using various control schemes. Regardless of the control scheme being used, the primary switch SW (M1) and the synchronous rectifier SR (M2) are complementary in operation with one switch being turned on while the other switch is turned off. The conduction periods of the primary switch SW and the synchronous rectifier SR do not overlap. When the primary switch SW is turned on, the primary winding of the transformer $L_P$ is connected to the input voltage $V_{IN}$ and the primary current Ipri increases linearly as the magnetic flux in the transformer increases. Energy is stored in the transformer $L_P$. At this time, the voltage $V_{SEC}$ induced in the secondary winding has a reverse polarity relative to the primary winding to cause the body diode D2 of the synchronous rectifier SR to be reversed biased. No secondary current Isec flows and the charge stored on the output capacitor $C_{OUT}$ supplies the load 20. With the primary switch SW turned on, the drain to source voltage $V_{DS(SW)}$ of the primary switch SW, at node 14, is at or near zero volts. Meanwhile, the secondary voltage $V_{SEC}$ of the synchronous rectifier SR (node 15), which is also the drain-to-source voltage $V_{DS(SR)}$ or $V_{DS}$ of the synchronous rectifier, is driven to a positive voltage being a ratio of the input voltage $V_{IN}$.

After the on period of the primary switch expires, the primary switch is turned off and the synchronous rectifier is turned on after a non-overlapping period. When the primary switch is turned off, the primary current Ipri decreases and the magnetic flux drops. The voltage across the secondary winding reverses so that the secondary voltage has a positive polarity at the dotted terminal, or negative polarity at the drain of the synchronous rectifier (node 15), to cause the body diode D2 of the synchronous rectifier SR to become forward biased. As a result, current flows through the secondary winding as the secondary current Isec. The secondary current Isec increases to a peak current value. As a result of the negative polarity voltage at the drain of the synchronous rectifier, the synchronous rectifier SR is turned on after the non-overlapping period to conduct the secondary current Isec and to aid in the transfer of the stored energy from the transformer core to the output capacitor $C_{OUT}$. The output capacitor $C_{OUT}$ is recharged and supplies the load 20. The output voltage $V_{OUT}$ (node 16) is sustained by the charge on the output capacitor $C_{OUT}$. When the primary switch SW is turned off, the drain to source voltage $V_{DS(SW)}$ of the primary switch SW (node 14) swings to a high voltage value. In some examples, a voltage clamping circuit, such as the active clamp circuit 25, is used to clamp the drain voltage at the primary switch to a maximum allowable voltage value to protect the primary switch.

The control scheme being implemented in the flyback converter includes a feedback control loop to monitor the output voltage $V_{OUT}$. The control scheme being applied controls the on-time of the synchronous rectifier or the off-time of the primary switch to maintain the output voltage at the desired voltage value over various load conditions. At a prescribed time, the primary side or secondary side controller of the flyback converter initiates the next switching cycle by turning off the synchronous rectifier and turning on the primary switch. The operation described above repeats.

In the operation of the flyback converter 10, at the prescribed time, the secondary side controller signals the synchronous rectifier to turn off. However, due to the propagation delay and gate driver discharge time, the gate voltage $V_{GS2}$ of the synchronous rectifier M2 is often delayed in turning off the synchronous rectifier. As a result, the secondary current Isec experiences negative current or reverse current excursion, as explained in further details with reference to FIG. 6.

Figure 6:
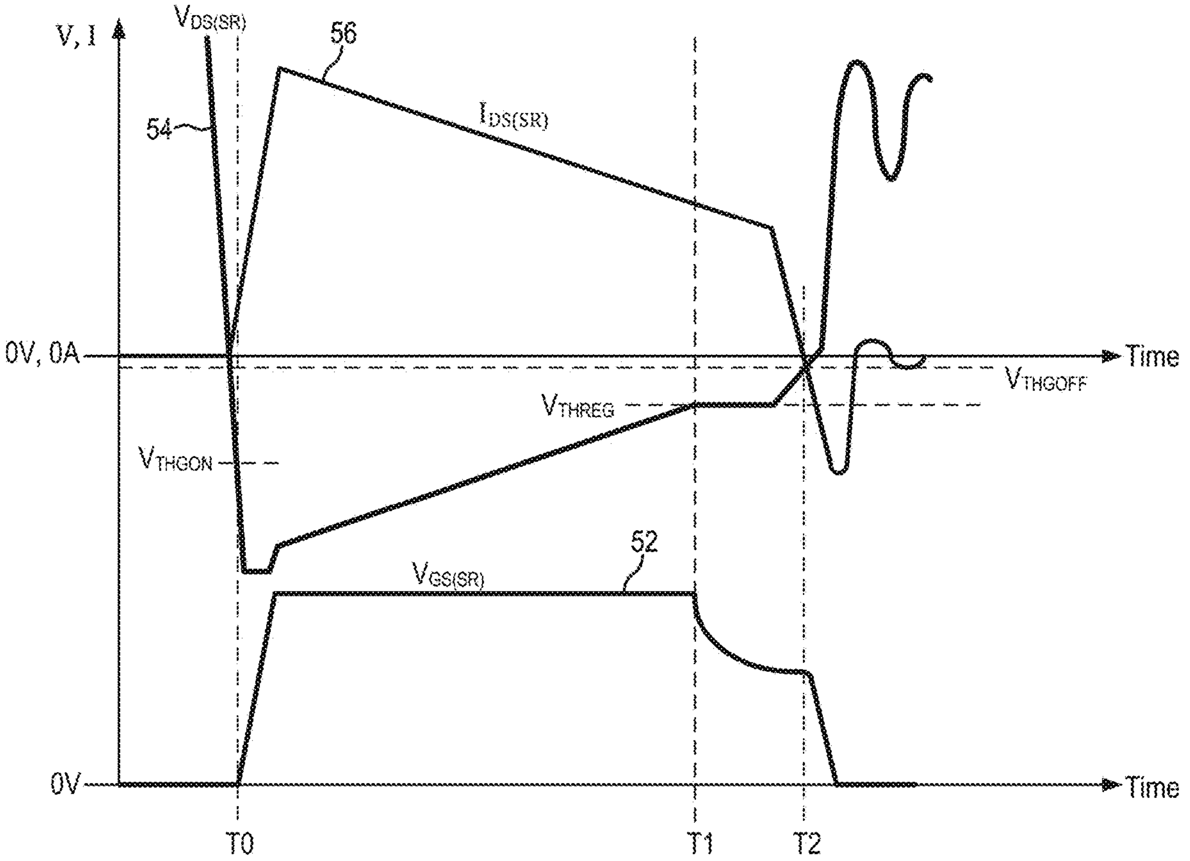
FIG. 6 illustrates signal waveforms in a switching cycle of the synchronous rectifier in the flyback converter of FIG. 4 during the on period of the synchronous rectifier in some examples.

FIG. 6 illustrates signal waveforms in a switching cycle of the synchronous rectifier in the flyback converter of FIG. 4 during the on period of the synchronous rectifier in some examples. Referring to FIG. 6, at time T0 of the switching cycle, the primary switch has turned off and the voltage across the secondary winding has reversed, the secondary current or the drain-to-source current $I_{DS(SR)}$ (also referred to as drain current $I_{DS}$) (curve 56) conducts through the forward-biased body diode of the synchronous rectifier M2 and the drain voltage $V_{DS(SR)}$ (curve 54) at the drain terminal of the synchronous rectifier M2 drops to a negative voltage value. When the drain voltage $V_{DS(SR)}$ drops to a negative voltage value greater than the SR turn on detection voltage $V_{THGON}$, the synchronous rectifier M2 is signaled to turn on, and the gate voltage $V_{GS(SR)}$ (curve 52) driving the synchronous rectifier is ramped up. In the present description, the drain volage $V_{DS(SR)}$ refers to the drain voltage $V_{DS}$ and the gate voltage $V_{GS(SR)}$ refers to gate voltage $V_{GS2}$ in FIGS. 4 and 5. Accordingly, the synchronous rectifier is turned on and conducts the drain current $I_{DS(SR)}$ to the output capacitor. In practice, the drain voltage $V_{DS}$ of the synchronous rectifier is a function of the drain current $I_{DS(SR)}$ and the on resistance RDSon of the synchronous rectifier switch. In other words, the drain voltage $V_{DS(SR)}$ follows the drain current $I_{DS(SR)}$.

During the on period of the synchronous rectifier, the drain current $I_{DS(SR)}$ conducts current to transfer the energy stored in the secondary winding of the transformer $L_P$ to the output capacitor $C_{OUT}$. As the energy is transferred, the drain current $I_{DS(SR)}$ decreases and the drain voltage $V_{DS(SR)}$ decreases accordingly. In some embodiments, the drain voltage is measured to use as a proxy for the drain current of the synchronous rectifier. In the present example, when the voltage $V_{DS(SR)}$ decreases to the regulation threshold $V_{THREG}$ (time T1), the gate voltage $V_{GS(SR)}$ is regulated to support the drain current as the drain current continue to decrease. As long as the gate voltage can be lowered to meet the drain current demand, the drain voltage $V_{DS(SR)}$ is regulated around the regulation voltage level $V_{THREG}$. At time T2, the drain current has decreased to a zero current level and the drain voltage $V_{DS(SR)}$ decreases to the SR turn off detection voltage $V_{THGOFF}$, which signals the synchronous rectifier M2 is to be turned off. However, as a result of the inherent propagation delay in the secondary side controller (FIG. 5) and the time it takes to discharge the gate driver, there is a delay in the synchronous rectifier M2 actually getting turned off. Furthermore, the slope of the drain current can be quite large during this time period. This result in the drain current crossing zero current and becoming a negative current (or reverse current), as shown in FIG. 6. When the primary switch (M1) is turned on, the negative drain current has to be dissipated which causes a large voltage swing on the drain voltage $V_{DS(SR)}$ of the synchronous rectifier (M2). The large voltage swing on the drain voltage $V_{DS(SR)}$ of the synchronous rectifier is not desirable as it may impact the reliability of the synchronous rectifier switch.

It is instructive to note that the use of the regulation threshold $V_{THREG}$ to regulate down the gate voltage $V_{GS(SR)}$ as the drain current (or secondary current) is decreasing has the additional benefits of decreasing the gate voltage level at least partially prior to the synchronous rectifier shut-off so that the time to discharge and shut off the synchronous rectifier is reduced, as only the remaining amount of gate voltage needs to be discharged.

Figure 7:
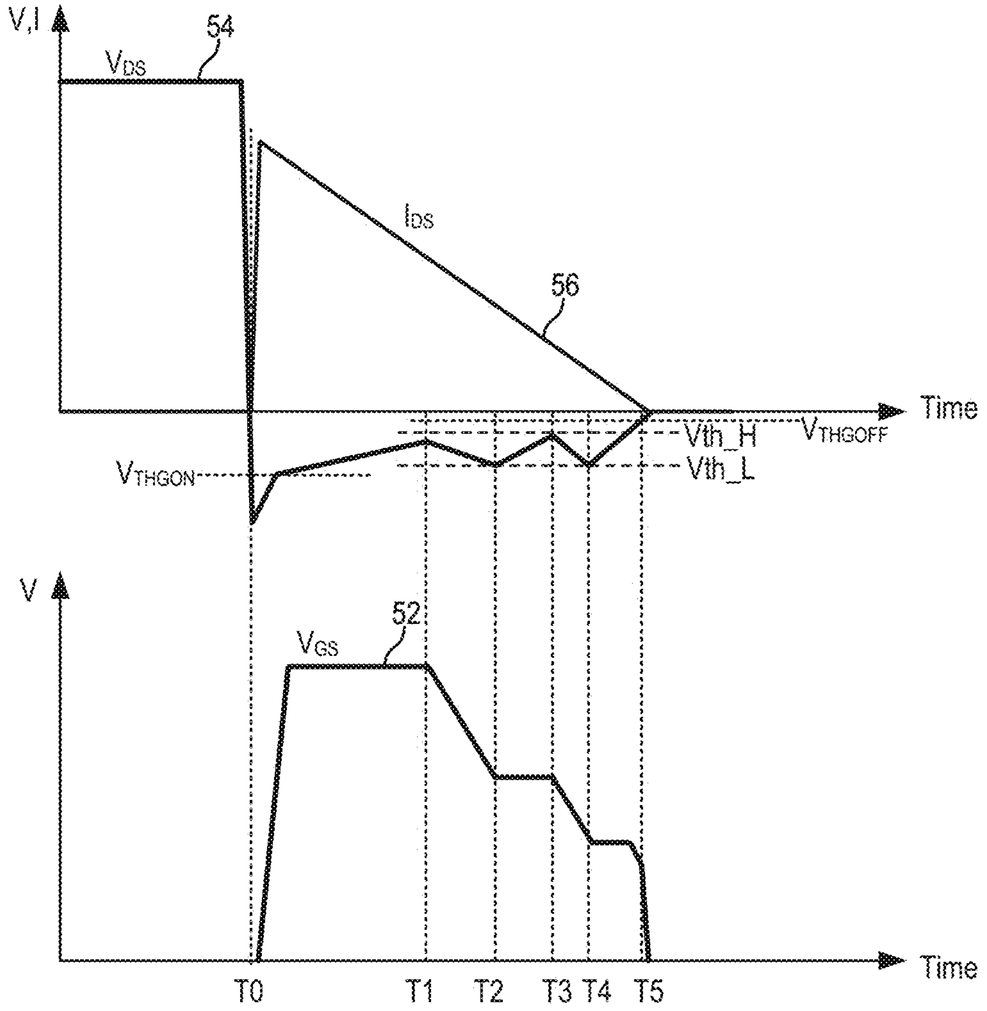
FIG. 7 illustrates signal waveforms in a switching cycle of the synchronous rectifier in the flyback converter of FIG. 4 during the on period of the synchronous rectifier in alternate examples.

FIG. 7 illustrates signal waveforms in a switching cycle of the synchronous rectifier in the flyback converter of FIG. 4 during the on period of the synchronous rectifier in alternate examples. In particular, FIG. 7 illustrates the use of hysteresis in the regulation threshold voltage. In some applications, a hysteresis regulation threshold, including a high regulation threshold voltage Vth_H and a low regulation threshold voltage Vth_L, is used to step down the gate voltage while maintaining the decreasing drain current (or secondary current) $I_{DS}$ during the regulation period. The drain voltage $V_{DS}$ of the synchronous rectifier is allowed to ping-pong between the high and low regulation threshold voltages while the gate voltage $V_{GS}$ of the synchronous rectifier decreases in a stepwise fashion to regulate the drain current decrease.

Referring to FIG. 7, at time T1, the drain voltage $V_{DS}$ of the synchronous rectifier drops pass the SR turn on detection voltage $V_{THGON}$ and the gate voltage $V_{GS}$ of the synchronous rectifier is ramped up to turn on the synchronous rectifier. During the on period of the synchronous rectifier, the drain current $I_{DS}$ decreases and the drain voltage $V_{DS}$ decreases accordingly. At time T1, the drain voltage $V_{DS}$ reaches the high regulation threshold voltage Vth_H. As a result, the gate voltage $V_{GS}$ is lowered in order to maintain the decreasing drain current $I_{DS}$ and the drain voltage $V_{DS}$ increases or becomes more negative. At time T2, when the drain voltage $V_{DS}$ has increased to the low regulation threshold voltage Vth_L, the gate voltage $V_{GS}$ is fixed and the drain voltage $V_{DS}$ is allowed to decrease again with the drain current $I_{DS}$. At time T3, the drain voltage $V_{DS}$ again reaches the high regulation threshold voltage Vth_H and the gate voltage $V_{GS}$ is lowered to maintain the decreasing drain current $I_{DS}$ while the drain voltage $V_{DS}$ increases or becomes more negative. At time T4, the drain voltage $V_{DS}$ has increased to the low regulation threshold voltage Vth_L and the gate voltage $V_{GS}$ is fixed again to allow the drain voltage to decrease. At time T5, the secondary side controller detects that the drain voltage has decreased below the high regulation threshold voltage Vth_H and has crossed the SR turn off detection threshold $V_{THGOFF}$. The synchronous rectifier is signaled to turn off and the gate voltage is pulled to the ground voltage quickly. In this manner, the hysteresis regulation threshold voltages lower the gate voltage in a stepwise fashion while maintaining the drain current decrease.

In both the control scheme in FIGS. 6 and 7, the SR turn off detection voltage $V_{THGOFF}$ is selected to be very close to 0V. Typically, the SR turn off detection voltage $V_{THGOFF}$ is about −3 mV. The SR turn off detection voltage $V_{THGOFF}$ is set to be close to 0V in order to have shorter dead time between switching cycles. However, with the turn off detection threshold voltage value so close to 0V, and the downward slope of the secondary current being large at that time, the secondary current Isec can develop a large negative current, which results in a large drain voltage swing. The use of the hysteresis regulation threshold does not solve the negative secondary current issue.

In embodiments of the present invention, a power converter, such as a flyback converter, implements an adaptive gate voltage regulation method where the slope of the synchronous rectifier current is monitored and the gate discharge current is adaptively adjusted to apply a larger or smaller discharge current as a function of the rate of decrease of the synchronous rectifier current. For instance, when the rate of decrease of the synchronous rectifier current is large, a larger gate discharge current is applied to more rapidly decrease the gate voltage. On the other hand, when the rate of decrease of the synchronous rectifier current is smaller, a smaller gate discharge current is applied to decrease the gate voltage in a moderate manner.

Figure 8:
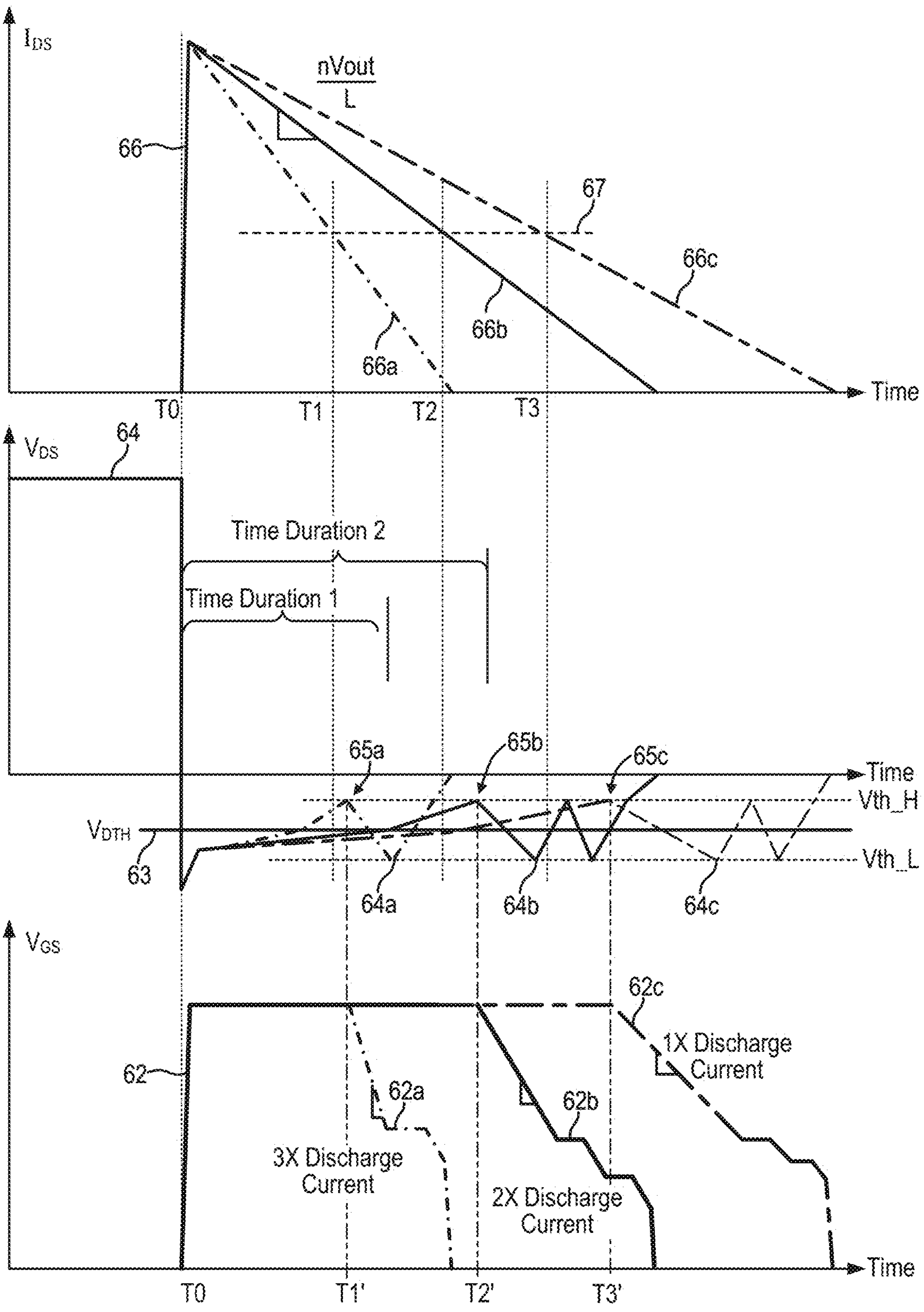
FIG. 8 illustrates signal waveforms in a switching cycle of a synchronous rectifier in a flyback converter implementing the adaptive gate voltage regulation method in embodiments of the present invention.

FIG. 8 illustrates signal waveforms in a switching cycle of a synchronous rectifier in a flyback converter implementing the adaptive gate voltage regulation method in embodiments of the present invention. In some embodiments, the flyback converter is implemented using the topology of the flyback converter 10 of FIG. 4. It is instructive to note that the portions of the waveforms in FIG. 8 are exaggerated to better illustrate the signal transitions. It is understood that the waveforms in FIG. 8 are not drawn to scale. Referring to FIG. 8, at time T0 of the switching cycle, the drain voltage $V_{DS}$ (curve 64) of the synchronous rectifier M2 drops to a negative voltage level to signal turning on the synchronous rectifier. The gate voltage $V_{GS}$ (curve 62) driving the synchronous rectifier is ramped up to turn on the synchronous rectifier. Gate voltage $V_{GS}$ in FIG. 8 refers to gate voltage $V_{GS2}$ in FIGS. 4 and 5. The synchronous rectifier M2 is turned on and conducts the secondary current or drain current $I_{DS}$ (curve 66) to the output capacitor. As described above, the drain voltage $V_{DS}$ of the synchronous rectifier is a function of the drain current $I_{DS}$ and the on resistance RDSon of the synchronous rectifier switch. In other words, the drain voltage $V_{DS}$ follows the drain current $I_{DS}$.

During the on period of the synchronous rectifier, the drain current $I_{DS}$ conducts current to transfer the energy stored in the secondary winding of the transformer $L_P$ to the output capacitor $C_{OUT}$. As the energy is transferred, the drain current $I_{DS}$ decreases and the drain voltage $V_{DS}$ decreases accordingly. It is instructive to note that the drain voltage $V_{DS}$ has a negative voltage value during the on period or conduction period of the synchronous rectifier. In the present description, a decreasing drain voltage during the synchronous rectifier conduction period refers to the voltage $V_{DS}$ decreasing in magnitude or becoming less negative and an increasing drain voltage during the synchronous rectifier conduction period refers to the voltage $V_{DS}$ increasing in magnitude or becoming more negative. In the present embodiment, the drain voltage decrease is regulated by hysteresis regulation threshold voltages, including the high regulation threshold voltage Vth_H and the low regulation threshold voltage Vth_L. The drain voltage $V_{DS}$ ping pong between the threshold voltages Vth_H and Vth_L while the gate voltage $V_{GS}$ decreases in a stepwise fashion to maintain the decreasing drain current $I_{DS}$. In particular, when the drain voltage $V_{DS}$ decreases to the high regulation threshold voltage Vth_H, the gate voltage $V_{GS}$ is discharged and when the drain voltage $V_{DS}$ increase to the low regulation threshold voltage Vth_L, the gate voltage $V_{GS}$ stops discharging and the drain voltage is decreased instead.

During the on period of the synchronous rectifier, the slope of the decreasing drain current $I_{DS}$ of the synchronous rectifier is a function of the output voltage Vout, the transformer design (such as the transformer turn ratio N) and the transformer magnetizing inductance $L_P$, where these factors can be different for different power converter designs or applications. In some applications, the output voltage can be changed on-the-fly, for example, between 5V to 20V, during operation of the power converter. As a result, the decreasing drain current $I_{DS}$ can have different slope values (or different rate of decrease) depending on the transformer design or the output voltage value. The controller driving the synchronous rectifier does not know the parameters of the transformer design or the specific output voltage being used.

Conventional synchronous rectifier controller design does not consider the different rate of decrease of the synchronous rectifier current and applies the same gate discharge control to discharge the synchronous rectifier gate voltage. The conventional controller design has shortcomings in that when the slope of the drain current decrease is large, the delay in turning off the synchronous rectifier may allow large negative drain current to develop, resulting in undesirable voltage swing across the synchronous rectifier.

According to embodiments of the present invention, an adaptive gate voltage regulation circuit and method is implemented in a synchronous rectifier controller to adaptively adjust the gate discharge control as a function of the slope of the drain current decrease. By way of explanation, FIG. 8 illustrates drain current $I_{DS}$ with three different rates of decrease or slopes. In particular, curve 66*a* (dot-dash line) denotes a drain current $I_{DS}$ with a large slope or a large rate of decrease, curve 66*b* (solid line) denotes a drain current $I_{DS}$ with a moderate slope or a moderate rate of decrease, and curve 66*c* (long-short dash line) denotes a drain current $I_{DS}$ with a small slope or a small rate of decrease. In some embodiments, the adaptive gate voltage regulation circuit and method of the present invention implements one or more time timers together with a current slope threshold $V_{DTH}$ to determine the rate of decrease of the synchronous rectifier drain current. Furthermore, the adaptive gate voltage regulation circuit and method of the present invention uses the drain voltage $V_{DS}$ of the synchronous rectifier as a proxy for the drain current—that is, the drain voltage $V_{DS}$ is measured and compared to the current slope threshold $V_{DTH}$ within the time durations defined by the timers to determine the rate of decrease of the synchronous rectifier drain current. The adaptive gate voltage regulation circuit and method uses the detected current slope information to determine how fast or slow the gate voltage should be discharged.

In embodiments of the present invention, the adaptive gate voltage regulation circuit and method uses a set of one or more timers and a current slope threshold to detect the slope of the drain current decrease. In the embodiment shown in FIG. 8, two timers—Timer 1 and Timer 2—are used to assess the drain current slope at two time durations. The use of two timers in FIG. 8 is illustrative only and not intended to be limiting. In actual implementations, any number of timers may be used. In the present embodiment, Timer 1 has a first time duration and Timer 2 has a second time duration longer than the first time duration. In some embodiments, a third timer (e.g. Timer 3) may be used to denote the time period after the expiration of Timer 2 and the end of the current switching cycle. The adaptive gate voltage regulation circuit and method applies a current slope threshold $V_{DTH}$ to use with the timers to measure the slope of the drain current decrease. The drain voltage $V_{DS}$ is measured against the threshold $V_{DTH}$ (line 63), which correspond to a threshold (line 67) in the drain current $I_{DS}$. In particular, the adaptive gate voltage regulation circuit and method determines within which time duration the drain voltage $V_{DS}$ reaches the current slope threshold $V_{DTH}$.

In one embodiment, the high regulation threshold voltage Vth_H and the low regulation threshold voltage Vth_L as well as the current slope threshold $V_{DTH}$ are all negative voltage values. The low regulation threshold voltage Vth_L is more negative than the high regulation threshold voltage Vth_H and the current slope threshold $V_{DTH}$ is between the high and low regulation thresholds Vth_L and Vth_H.

For instance, when the drain voltage reaches the current slope threshold $V_{DTH}$ before Timer 1 expires, then the drain current is deemed to have a large slope. If the drain voltage reaches the current slope threshold $V_{DTH}$ after Timer 1 expires but before Time 2 expires, then the drain current is deemed to have a moderate slope. If the drain voltage reaches the current slope threshold $V_{DTH}$ after Timer 2 expires, then the drain current is deemed to have a small slope. The adaptive gate voltage regulation circuit and method applies different gate discharge control as a function of the detected current slope. For large current slope, a faster gate discharge is applied, such as by using a larger amount of gate discharge current. For smaller current slope, a slower gate discharge can be used, such as by using a smaller amount of gate discharge current. In this manner, fast gate turn off can be achieved regardless of the slope of the synchronous rectifier current.

In the example shown in FIG. 8, drain voltage $V_{DS}$ **64*a*, corresponding to drain current $I_{DS}$ 66*a*, crosses the current slope threshold at time T1, before the expiration of time duration 1 of Timer 1. The current slope of the drain current $I_{DS}$ 66*a* is deemed to be large. Thus, when the drain voltage $V_{DS}$ 64*a* eventually reached the high regulation threshold voltage Vth_H (at time T1') as indicated by arrow 65*a*, the gate voltage $V_{GS}$ 62*a*** is being discharged by 3× or 3 times the unit discharge current.

Meanwhile, drain voltage $V_{DS}$ **64*b*, corresponding to drain current $I_{DS}$ 66*b*, crosses the current slope threshold at time T2, after the expiration of time duration 1 of Timer 1 but before the expiration of time duration 2 of Timer 2. The current slope of the drain current $I_{DS}$ 66*b* is deemed to be moderate. Thus, when the drain voltage $V_{DS}$ 64*b* eventually reached the high regulation threshold voltage Vth_H (at time T2') as indicated by arrow 65*b*, the gate voltage $V_{GS}$ 62*b*** is being discharged by 2× or 2 times the unit discharge current.

Finally, drain voltage $V_{DS}$ **64*c*, corresponding to drain current $I_{DS}$ 66*c*, crosses the current slope threshold at time T3, after the expiration of time durations 1 and 2 of Timers 1 and 2. The current slope of the drain current $I_{DS}$ 66*c* is deemed to be small. Thus, when the drain voltage $V_{DS}$ 64*c* eventually reached the high regulation threshold voltage Vth_H (at time T3') as indicated by arrow 65*c*, the gate voltage $V_{GS}$ 62*c*** is being discharged by 1× or the unit discharge current.

In the embodiment described in FIG. 8, the power converter uses hysteresis regulation thresholds Vth_H and Vth_L to decrease the gate voltage to maintain the drain current of the synchronous rectifier. The drain voltage of the synchronous rectifier is regulated between the hysteresis regulation thresholds. In other embodiments, the power converter may use a single regulation threshold, such as the regulation threshold $V_{THREG}$ of FIG. 6, to control the gate voltage decrease while regulating the drain voltage around the regulation threshold $V_{THREG}$. The adaptive gate voltage regulation method can be applied to a power converter using a single regulation threshold or hysteresis regulation thresholds. In the case of a power converter using a single regulation threshold, the current slope threshold $V_{DTH}$ is set to be more negative, or having a greater negative voltage value, than the regulation threshold $V_{THREG}$.

Figure 9:
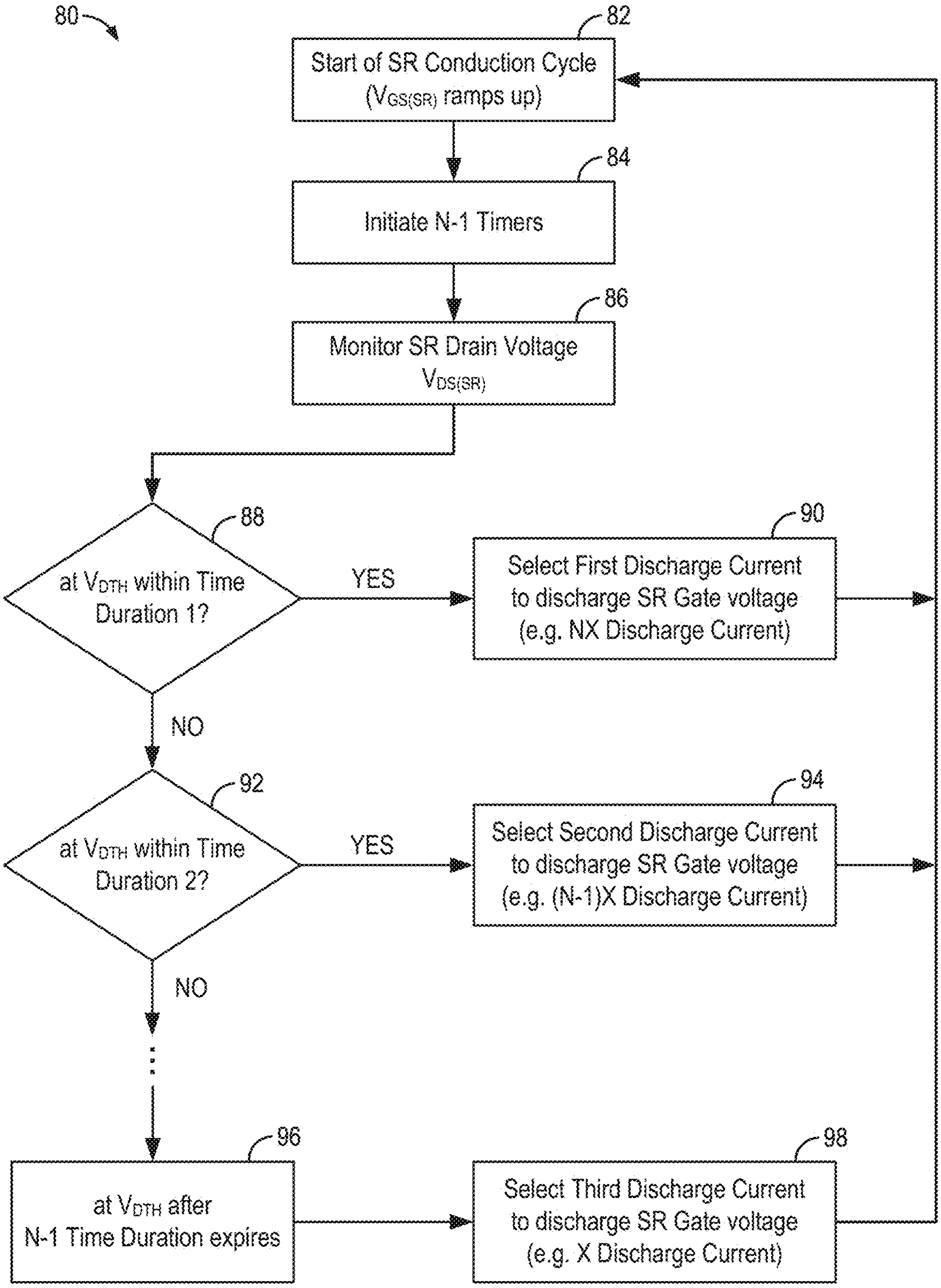
FIG. 9 is a flowchart illustrating the adaptive gate voltage regulation method which can be implemented in a power converter, such as the flyback converter of FIG. 4, in embodiments of the present invention.

The operation of the adaptive gate voltage regulation method of the present invention will be explained in more detail below with reference to FIG. 9. FIG. 9 is a flowchart illustrating the adaptive gate voltage regulation method which can be implemented in a power converter, such as the flyback converter of FIG. 4, in embodiments of the present invention. Referring to FIG. 9, a method 80 begins at the start of the synchronous rectifier conduction cycle (82). The gate voltage $V_{GS}$ of the synchronous rectifier is ramped up. In response to the gate voltage $V_{GS}$ of the synchronous rectifier being ramped up, the method 80 initiates at least N−1 number of timers (84), each timer having increasing time durations as compared to the previous timer. For example, N is 3 and the method 80 initiates at least 2 timers defining a first time duration and a second time duration, the second time duration longer than the first time duration.

The method 80 monitors the drain voltage $V_{DS}$ of the synchronous rectifier (86). In particular, the method 80 compares the detected synchronous rectifier drain voltage to the current slope threshold $V_{DTH}$. The method 80 evaluates within which time period the drain voltage $V_{DS}$ of the synchronous rectifier reaches or exceed the current slope threshold $V_{DTH}$. The method 80 first determines if the drain voltage $V_{DS}$ of the synchronous rectifier reaches (i.e. at or exceed) the current slope threshold $V_{DTH}$ within the first time duration (Time Duration 1) (88). If the drain voltage $V_{DS}$ has reached the current slope threshold $V_{DTH}$ within the first time duration, then method 80 selects a first gate discharge current for discharging the gate voltage of the synchronous rectifier (90). Eventually, when the drain voltage $V_{DS}$ reaches the regulation threshold (either $V_{THREG}$ or Vth_H), the gate voltage will be discharged using the selected gate discharge current. In the present embodiment, the first gate discharge current is N times the unit discharge current, or N× discharge current.

The method 80 then determines if the drain voltage $V_{DS}$ of the synchronous rectifier reaches the current slope threshold $V_{DTH}$ after the first time duration but within the second time duration (Time Duration 2) (92). If the drain voltage $V_{DS}$ has reached the current slope threshold $V_{DTH}$ within the second time duration, then method 80 selects a second gate discharge current less than the first gate discharge current (94). Eventually, when the drain voltage $V_{DS}$ reaches the regulation threshold (either $V_{THREG}$ or Vth_H), the gate voltage will be discharged using the selected gate discharge current. In the present embodiment, the second gate discharge current is (N−1) times the unit discharge current, or (N×1)× discharge current.

The process continues for each time durations until the last time duration. At 96, the method 80 determines the drain voltage $V_{DS}$ of the synchronous rectifier reaches the current slope threshold $V_{DTH}$ after the last time duration (e.g. N−1 time duration) and the method 80 selects a third gate discharge current less than the second gate discharge current (98). Eventually, when the drain voltage $V_{DS}$ reaches the regulation threshold (either $V_{THREG}$ or Vth_H), the gate voltage will be discharged using the selected gate discharge current. In the present embodiment, the third gate discharge current is (N−(N−1)) times the unit discharge current, or × discharge current.

The method 80 then returns to the start of the next synchronous rectifier conduction cycle (82). The process continues again to initiate N−1 timers and to monitor the drain voltage $V_{DS}$ of the synchronous rectifier. By changing the gate discharge current as a function of the slope or the rate of decrease of the drain current of the synchronous rectifier, the method 80 can ensures fast turn-off of the synchronous rectifier even in the case of a large rate of decrease of the drain current. Negative current excursion and large voltage swing on the synchronous rectifier are thus avoided.

Figure 10:
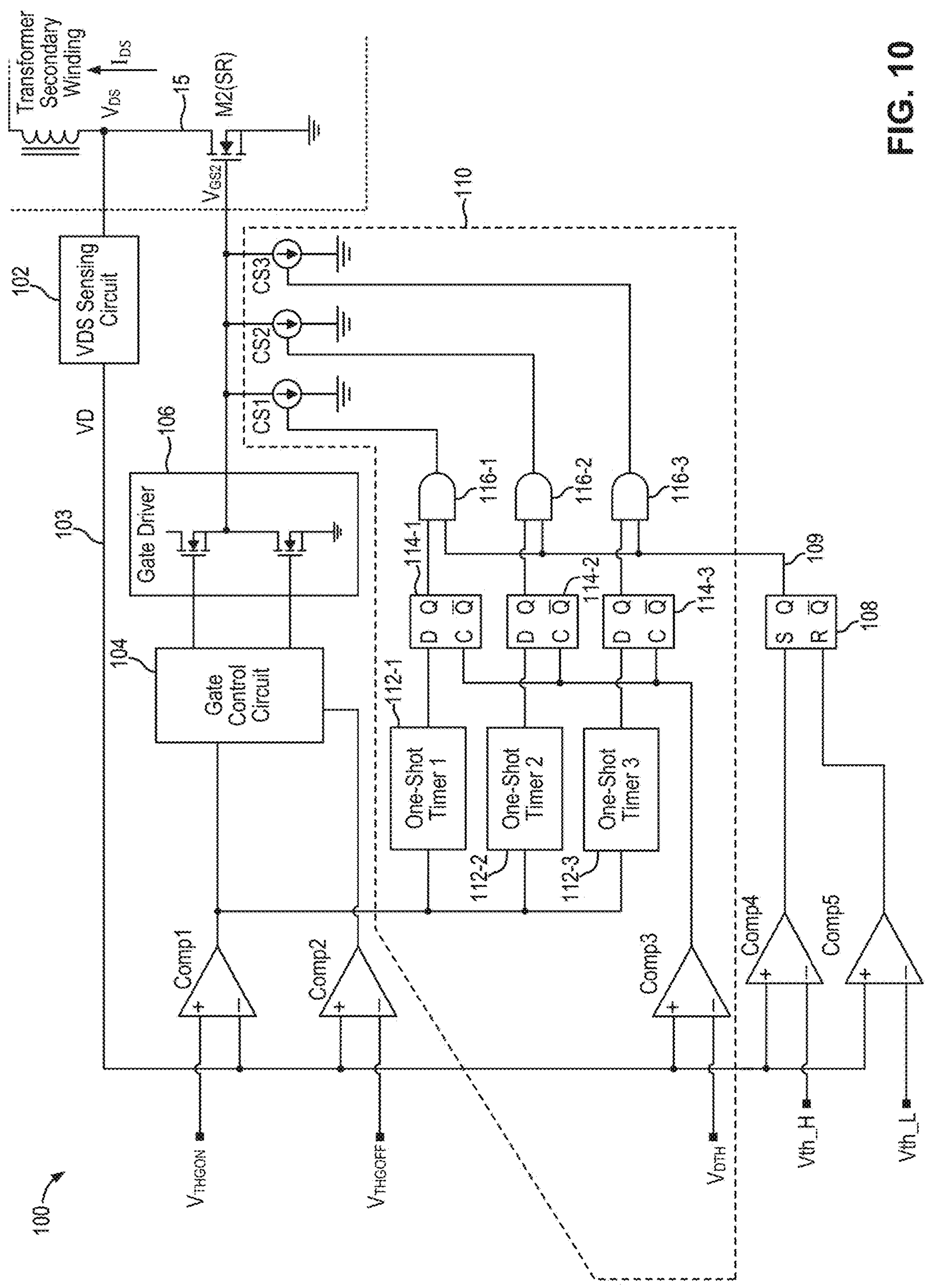
FIG. 10 is a schematic diagram of a secondary side controller in the flyback converter of FIG. 4 incorporating an adaptive turn-off voltage control circuit in embodiments of the present invention.
Figure 11:
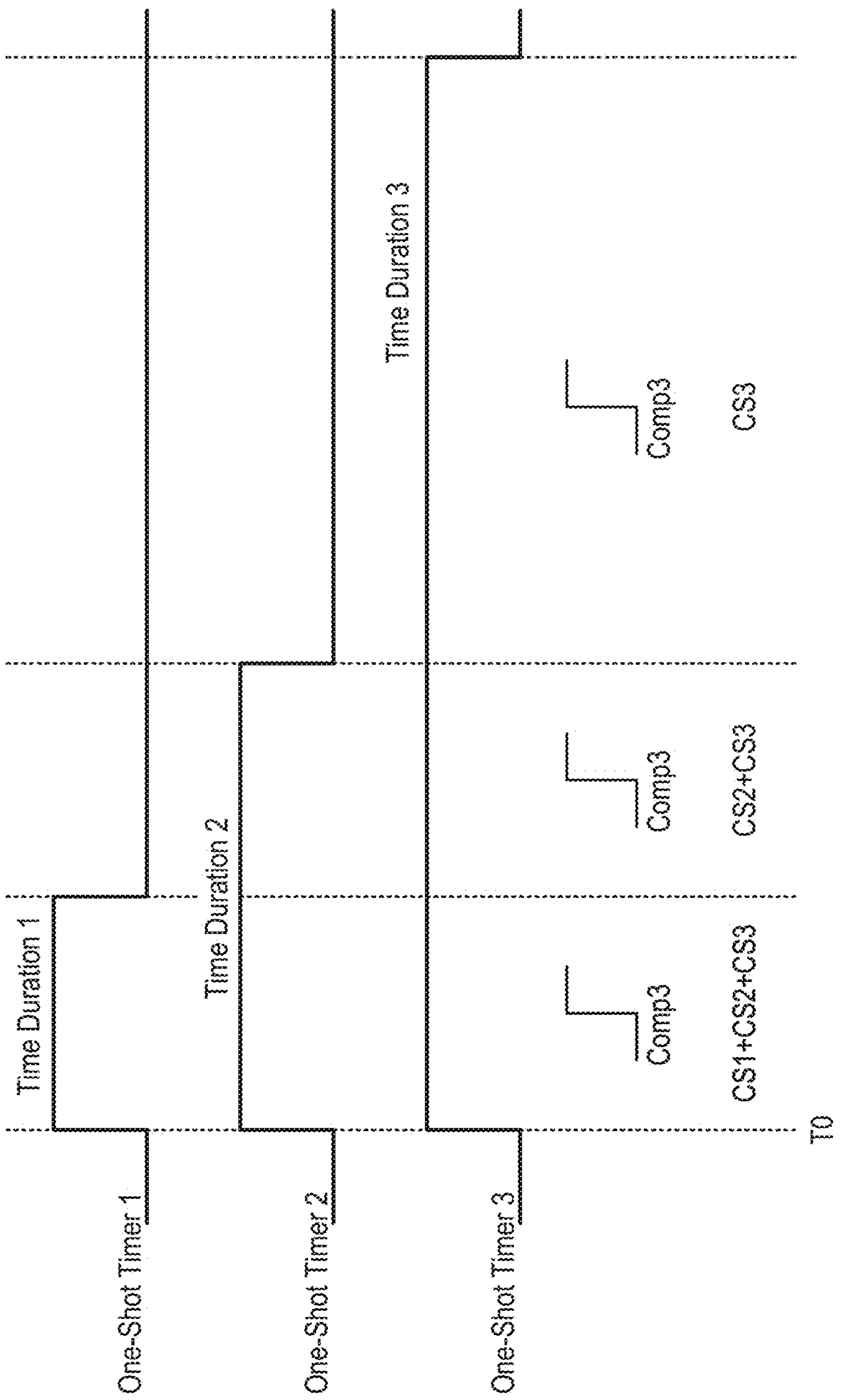
FIG. 11 is a timing diagram illustrating the time durations provided by the one-shot timer circuits in some examples.

FIG. 10 is a schematic diagram of a secondary side controller in the flyback converter of FIG. 4 incorporating an adaptive turn-off voltage control circuit in embodiments of the present invention. In some embodiments, the adaptive gate voltage regulation circuit implements the adaptive gate voltage regulation method of FIG. 9. Referring to FIG. 11, a secondary side controller 100 for generating the gate voltage $V_{GS2}$ to control the synchronous rectifier MOSFET M2 includes a drain voltage VDS sensing circuit 102 for sensing the drain voltage $V_{DS}$ of the synchronous rectifier M2. The sensed drain voltage (node 103), denoted as VD, is coupled to a pair of comparators Comp1 and Comp2 to be compared with respective detection threshold voltages to generate the gate on/off control signal for the synchronous rectifier M2. In particular, the comparator Comp1 compares the sensed drain voltage VD (node 103) to a SR turn on detection voltage $V_{THGON}$ to determine when the synchronous rectifier M2 should be turned on and the comparator Comp2 compares the sensed drain voltage VD (node 103) to a SR turn off detection voltage $V_{THGOFF}$ to determine when the synchronous rectifier M2 should be turned off. The secondary side controller 100 includes a gate on/off control logic circuit 104 which receives the output signals from the comparator Comp1 and Comp2 and generate the on/off control signal. The on/off control signal is coupled to a gate driver 10 which provides the gate voltage $V_{GS2}$ to drive the synchronous rectifier M2.

In the present embodiments, the secondary side controller 100 implement hysteresis regulation thresholds and includes a comparator Comp4 for comparing the sensed drain voltage VD (node 103) to the high regulation threshold Vth_H and a comparator Comp5 for comparing the sensed drain voltage VD (node 103) to the low regulation threshold Vth_L. The output signals of comparators Comp4 and Comp5 are coupled to drive the set and the reset inputs, respectively, of a set-reset flip-flop 108. The comparators Comp4 and Comp5 and set-reset flip-flop 108 operates to control the gate voltage $V_{GS2}$ of the synchronous rectifier in a stepwise downward fashion to deliver the necessary drain current $I_{DS}$ while regulating the drain voltage $V_{DS}$ of the synchronous rectifier within the hysteresis regulation thresholds, in the manner as described above with reference to FIGS. 7 and 8. More specifically, the set-reset flip-flop 108 generates an output signal 109 having a first logical state set by the output of comparator Comp4 to cause the gate voltage $V_{GS2}$ to be discharged and a second logical state reset by the output of comparator Comp5 to hold the gate voltage $V_{GS2}$ constant, that is, to not discharge the gate voltage.

In embodiments of the present disclosure, the secondary side controller 100 further includes an adaptive gate voltage regulation circuit 110 to select the desired amount of gate discharge current as a function of the slope of the drain current of the synchronous rectifier, as measured by the drain voltage $V_{DS}$. The adaptive gate voltage regulation circuit 110 includes one or more one-shot timer circuits 112-1 to 112-P (collectively referred to as "one-shot timer circuit 112"), each one-shot timer circuit 112 having different time durations. For example, the one-shot timer circuit 112-1 (one-shot timer 1) may be configured to have a first time duration (Time Duration 1), the one-shot timer circuit 112-2 (one-shot timer 2) may be configured to have a second time duration (Time Duration 2) longer than the first time duration, and the one-shot timer circuit 112-3 (one-shot timer 3) may be configured to have a third time duration (Time Duration 3) longer than the second time duration. For example, the third time duration can be as long as the conduction period of the synchronous rectifier. The one-shot timer circuits 112 are triggered by the output of comparator Comp1 which generates the signal to turn on the synchronous rectifier M2. Accordingly, in response to the comparator Comp1 being asserted, all the one-shot timer circuits 112 are activated.

FIG. 11 is a timing diagram illustrating the time durations provided by the one-shot timer circuits 112 in some examples. Referring to FIG. 11, at time T0, in response to the output of comparator Comp1 being asserted, all of the one-shot timer circuits, including one-shot timer 1 (112-1), one-shot timer 2 (112-2) and one-shot timer 3 (112-3), are activated and are asserted for their respective time durations. One-shot timer 1 has a duration of Time Duration 1 and will expire before the Time Duration 2 of the one-shot timer 2. One-shot timer 3 has a duration that may be the expected conduction period of the synchronous rectifier. That is, Time Duration 3 may extend for the entire conduction period of the synchronous rectifier.

Returning to FIG. 10, the adaptive gate voltage regulation circuit 110 includes a set of D-flip-flops 114, each flip-flop coupled to one of the one-shot timer circuits. In particular, the one-shot timer circuit 112-1 provides its output to the data input terminal of a D-flip-flop 114-1, the one-shot timer circuit 112-2 provides its output to the data input terminal of a D-flip-flop 114-2, and the one-shot timer circuit 112-3 provides its output to the data input terminal of a D-flip-flop 114-3. The data input to each D-flip-flop is passed to the data output terminal (Q) in response to the clock input (C) being asserted.

The adaptive gate voltage regulation circuit 110 includes a comparator Comp3 which compares the sensed drain voltage VD (node 103) to the current slope threshold $V_{DTH}$. The output of comparator Comp3 is coupled to the clock input terminals of the D-flip-flops 114, including D-flip-flops 114-1 to 114-3. As thus configured, the one-shot timer circuits 112 and the D-flip-flop circuits 114, as clocked by the comparison output of comparator Comp3, measures the slope of the drain current decrease by determining in which time duration the drain voltage crosses the current slope threshold $V_{DTH}$. Referring to FIG. 11, in the case the comparator Comp3 is asserted during Time Duration 1, then all three D-flip-flops 114-1 to 114-3 pass their data input, which is at a logical high level, to the data output terminals. In the case the comparator Comp3 is asserted after Time Duration 1 but before expiration of Time Duration 2, then only D-flip-flops 114-2 and 114-3 pass a logical high level to their data output terminals. Because Time Duration 1 has already expired, the D-flip-flop 114-1 passes a logical low to its output terminal. Finally, in the case the comparator Comp3 is asserted after Time Duration 2, then only D-flip-flop 114-3 passes a logical high level to its data output terminals. Because Time Duration 1 and Time Duration 2 have already expired, the D-flip-flop 114-1 and 114-2 both pass a logical low to its output terminal.

The adaptive gate voltage regulation circuit 110 includes a set of logical AND gates 116, including logical AND gates 116-1 to 116-3. In particular, the output of each D-flip-flop 114 is coupled to a respective logical AND gate 116. At each logical AND gate 116, the output of each D-flip-flop 114 is logically ANDed with the output 109 of the set-reset flip-flop 108, indicating whether the gate voltage should be discharged. The output signals of the logical AND gates 116 are coupled to respective current sources CS1 to CS3. Current sources CS1 to CS3 are coupled to the gate terminal of the synchronous rectifier M2 and when turned on, provides a discharge current to discharge the voltage at the gate terminal of the MOSFET switch M2. In some embodiments, the current sources CS1 to CS3 provide the same amount of discharge current, so that each current source CS1 to CS3 provides a unit discharge current. In other embodiments, the current sources CS1 to CS3 have different current values, and a single current source may be selected or a combination of two or more of the current sources may be selected to provide the desired amount of discharge current.

In operation, when the output of comparator Comp3 is asserted, in response to the sensed drain voltage VD reaching the current slope threshold $V_{DTH}$, the D-flip-flops 114-1 to 114-3 are clocked and provide logical high or logical low output signals to the input of the respective logical AND gates 116. In the case the output of comparator Comp3 is asserted during the Time Duration 1, all three D-flip-flops 114-1 to 114-3 provide a logical high signal to the logical AND gates 116. As a result, when the signal 109 is asserted, all three current sources CS1, CS2 and CS3 are turned on to discharge the gate voltage $V_{GS2}$. The discharge current is therefore the sum of the current sources CS1, CS2 and CS3. In this case, the drain current is determined to have a steep slope and therefore a larger discharge current is used to ensure that the synchronous rectifier is turned off quickly and the drain current does not have a large negative current excursion.

In the case the output of comparator Comp3 is asserted after the Time Duration 1 and before Time Duration 2 expires, two D-flip-flops 114-2 and 114-3 provide a logical high signal to the logical AND gates 116. As a result, when the signal 109 is asserted, two current sources CS2 and CS3 are turned on to discharge the gate voltage $V_{GS2}$. The discharge current is therefore the sum of the current sources CS2 and CS3. The sum of the current sources CS2 and CS3 has a current value that is less than the sum of all three current sources CS1 to CS3. Logical AND gate 116-1 remains deasserted due to one of its input being at a logical low level. In this case, the drain current is determined to have a moderate slope and therefore a moderate discharge current is used to turn off the synchronous rectifier quickly.

In the case the output of comparator Comp3 is asserted after the Time Durations 1 and 2 have both expired, only D-flip-flops 114-3 provides a logical high signal to the logical AND gates 116. As a result, when the signal 109 is asserted, one current source CS3 is turned on to discharge the gate voltage $V_{GS2}$. The discharge current provided by current source CS3 is less than the sum of the current sources CS2 and CS3 or the sum of all three current sources CS1 to CS3. Logical AND gates 116-1 and 116-2 remain deasserted due to one of their inputs being at a logical low level. In this case, the drain current is determined to have a small slope and only a small discharge current is needed to turn off the synchronous rectifier quickly.

In embodiments of the present invention, current sources CS1 to CS3 may each provide the unit discharge current so that a combination of two or more of the current sources provides a multiple of the unit discharge current. In other embodiments, the current sources CS1 to CS3 may have different current values and the combination of two or more current sources provides a larger current value than the individual current sources. For instance, the activation of all three current sources CS1, CS2 and CS3 provides a first discharge current value which is larger than the activation of any two of the current sources or any single current source. Similarly, the activation of any two of the three current sources provides a second discharge current which is larger than any single current source.

As thus configured, the adaptive gate voltage regulation circuit 110 operates to select adaptively the gate discharge current as a function of the drain current slope or rate of decrease. The flyback converter can realize fast synchronous rectifier turn off, which has the effect of reducing negative current excursion on the secondary current and reducing large voltage swing on the drain voltage of the synchronous rectifier as a result.

In the above description, a flyback converter including a transformer is described. It is understood that the adaptive turn-off voltage control circuit and method can be applied to other types of power converters or switching regulators, with or without transformer isolation. The terms "primary current" and "secondary current" as used herein refer to the current flowing through the primary switch and the current flowing through the synchronous rectifier, respectively. The use of a transformer isolated power converter in the present description is illustrative only and not intended to be limiting.

In this detailed description, process steps described for one embodiment may be used in a different embodiment, even if the process steps are not expressly described in the different embodiment. When reference is made herein to a method including two or more defined steps, the defined steps can be carried out in any order or simultaneously, except where the context dictates or specific instruction otherwise are provided herein. Further, unless the context dictates or express instructions otherwise are provided, the method can also include one or more other steps carried out before any of the defined steps, between two of the defined steps, or after all the defined steps In this detailed description, various embodiments or examples of the present invention may be implemented in numerous ways, including as a process; an apparatus; a system; and a composition of matter. A detailed description of one or more embodiments of the invention is provided above along with accompanying figures that illustrate the principles of the invention. The invention is described in connection with such embodiments, but the invention is not limited to any embodiment. Numerous modifications and variations within the scope of the present invention are possible. The scope of the invention is limited only by the claims and the invention encompasses numerous alternatives, modifications, and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. The present invention is defined by the appended claims.

The invention claimed is:

1. A power converter, comprising:

an input terminal receiving an input voltage and an output terminal providing an output voltage;

a synchronous rectifier coupled to the output terminal; and a controller coupled to generate a gate control signal to drive a gate terminal of the synchronous rectifier over a plurality of synchronous rectifier (SR) conduction cycles, the controller comprising an adaptive gate voltage regulation circuit detecting a voltage indicative of a drain current of the synchronous rectifier in each SR conduction cycle and monitoring a slope of the detected voltage indicative of a rate of decrease of the drain current of the synchronous rectifier, the adaptive gate voltage regulation circuit further selecting a gate discharge current as a function of the slope of the detected voltage to apply to the gate terminal of the synchronous rectifier.

2. The power converter of claim 1, wherein the adaptive gate voltage regulation circuit detects the drain voltage at the drain terminal of the synchronous rectifier as the voltage indicative of the drain current.

3. The power converter of claim 1, wherein in response to the detected voltage indicating the drain current having a first slope value, the adaptive gate voltage regulation circuit selects a first gate discharge current; in response to the detected voltage indicating the drain current has a second slope value less than the first slope value, the adaptive gate voltage regulation circuit selects a second gate discharge current less than the first gate discharge current; and the adaptive gate voltage regulation circuit applies the selected gate discharge current to discharge a gate voltage of the synchronous rectifier in response to the controller detecting a drain voltage at a drain terminal of the synchronous rectifier having reached a first regulation threshold.

4. The power converter of claim 3, wherein the adaptive gate voltage regulation circuit further comprises a plurality of timers establishing a plurality of time durations, including at least a first time duration and a second time duration longer than the first time duration.

5. The power converter of claim 4, wherein the adaptive gate voltage regulation circuit determines the detected voltage indicative of the drain current has the first slope value by determining the detected voltage at or exceeding a first threshold within the first time duration; and the controller determines the detected voltage indicating the drain current having the second slope value by determining the detected voltage at or exceeding the first threshold after expiration of the first time duration and within the second time duration.

6. The power converter of claim 5, wherein the first threshold and the first regulation threshold both comprise negative voltage values, the first threshold having a greater negative voltage value than the first regulation threshold.

7. The power converter of claim 3, wherein the adaptive gate voltage regulation circuit comprises a plurality of current sources, including at least a first current source providing a first current value and a second current source providing a second current value, the first gate discharge current being provided by activating the first current source and the second current source and the second gate discharge current being provided by activating the first current source only.

8. The power converter of claim 7, wherein the first and second current sources have the same current value being a unit gate discharge current, and the first gate discharge current being the sum of the first and second current sources providing N times the unit gate discharge current.

9. The power converter of claim 7, wherein the first and second current sources have different current values.

10. The power converter of claim 3, wherein the adaptive gate voltage regulation circuit stops discharging the gate voltage of the synchronous rectifier in response to the controller detecting the drain voltage having reached a second regulation threshold more negative than the first threshold.

11. The power converter of claim 10, wherein the controller continues to detect the drain voltage at the drain terminal of the synchronous rectifier; in response to the detected drain voltage reaching the first regulation threshold, the adaptive gate voltage regulation circuit discharges the gate voltage of the synchronous rectifier using the selected gate discharge current; wherein the controller repeats detecting the drain voltage and the adaptive gate voltage regulation circuit repeats discharging and stopping the discharging of the gate voltage until the end of the SR conduction cycle.

12. The power converter of claim 5, wherein the plurality of timers comprises a plurality of one-shot timers having different time durations, the plurality of one-shot timers being initiated at a start of each SR conduction cycle and each one-shot timer being asserted during the respective time durations.

13. The power converter of claim 12, wherein the adaptive gate voltage regulation circuit comprises a plurality of current sources, including at least a first current source providing a first current value and a second current source providing a second current value, each current source being controlled by a respective one-shot timer to provide the respective current value, and one or more of the plurality of current sources being activated to provide the selected gate discharge current.

14. The power converter of claim 13, wherein in response to the adaptive gate voltage regulation circuit determining the detected voltage indicating the drain current has the first slope value within the first time duration in which a first one-shot timer and a second one-shot timer remain asserted, the adaptive gate voltage regulation circuit activates the first current source controlled by the first one-shot timer and the second current source controlled by the second one-shot timer to provide the first gate discharge current being the sum of the current values of the first and second current sources.

15. The power converter of claim 14, wherein in response to the adaptive gate voltage regulation circuit determining the detected voltage indicating the drain current has the second slope value after the first time duration and within the second time duration in which the second one-shot timer remains asserted, the adaptive gate voltage regulation circuit activates the second current source controlled by the second one-shot timer to provide the second gate discharge current being the current value of the second current source.

16. The power converter of claim 15, wherein the adaptive gate voltage regulation circuit further comprises a comparator comparing the detected voltage indicative of the drain current and the first threshold, an output signal of the comparator being asserted in response to the detected voltage at or exceeding the first threshold.

17. The power converter of claim 16, wherein the adaptive gate voltage regulation circuit applies the output signal of the comparator to pass the signals of the plurality of one-shot timers to activate the respective current sources of the plurality of current sources.

* * * * *